G. TÜSCHEL.
COMPOSITE LUMBER AND METHOD OF MANUFACTURING THE SAME.
APPLICATION FILED OCT. 11, 1913. RENEWED JAN. 23, 1917.
1,217,369. Patented Feb. 27, 1917.
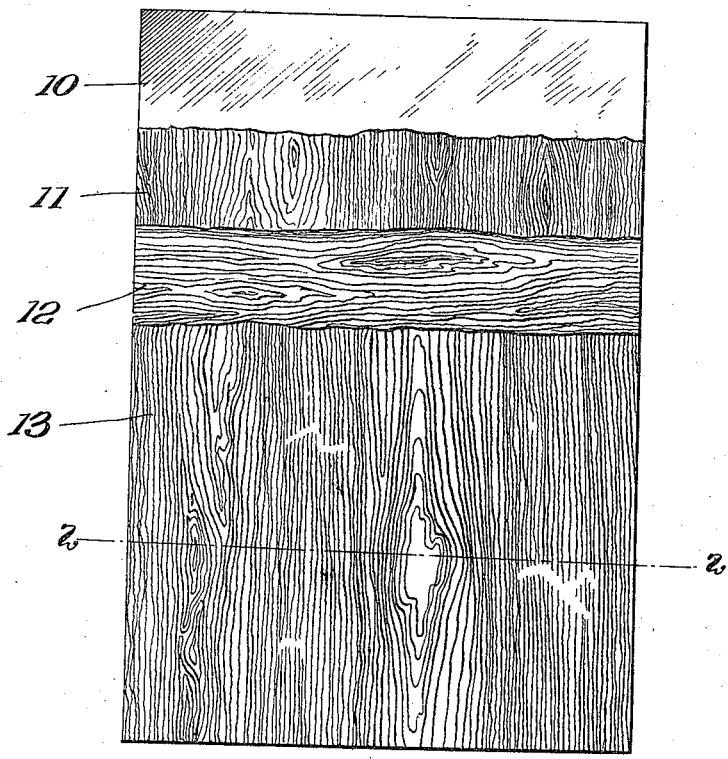
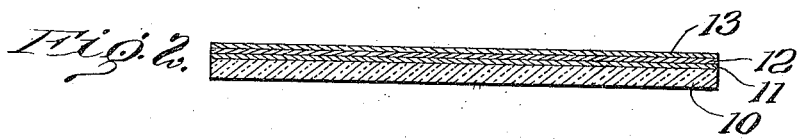
Witnesses
Gustav Tüschel Inventor
By Bedford & Doolittle
Attorneys

UNITED STATES PATENT OFFICE.

GUSTAV TÜSCHEL, OF NEW YORK, N. Y.

COMPOSITE LUMBER AND METHOD OF MANUFACTURING THE SAME.

1,217,369. Specification of Letters Patent. Patented Feb. 27, 1917.

Application filed October 11, 1913, Serial No. 794,647. Renewed January 23, 1917. Serial No. 144,049.

*To all whom it may concern:*

Be it known that I, GUSTAV TÜSCHEL, a citizen of the United States, residing at New York, county and State of New York, have invented and discovered certain new and useful Improvements in Composite Lumber and Methods of Manufacturing the Same, of which the following is a specification.

My said invention consists in a new character of composite lumber and in an improved method and means for the manufacture of the same, being intended especially for use in the manufacture of high grade furniture, such as piano cases, and cases for other musical instruments, parlor tables, billiard tables, etc., whereby furniture of such character may be provided with tops and exposed sides which will maintain their shape, contour and finish perfectly, and without danger of warping, or "peeling", under any conditions of weather or time, all as will be hereinafter more fully described and claimed.

In the accompanying drawings, Figure 1 shows a view of a piece of composite lumber embodying my invention, in top plan, the several layers being indicated by broken lines extending transversely across the view; and Fig. 2 a cross-section on the dotted line 2—2 in Fig. 1.

In said drawings, the part marked 10 indicates the base of the composite lumber, consisting of a sheet of plate glass; 11 the layer of veneer next to said glass; 12 the intermediate layer of veneer; and 13 the top layer of veneer.

Said veneer or composite lumber is made up of a base of plate glass shaped to correspond to the form desired for the surface on which it is to be used. Said glass is covered with several (preferably three) separate layers of veneer which are secured thereto and to each other by a special compound provided for the purpose and made in a peculiar manner as follows:

I take three pounds of white glue and immerse the same in water for a period of ten or twelve hours and then cook it in water. After it is thoroughly cooked I add one half pound of powdered asbestos, and one quarter pound of magnesia which are thoroughly mixed with the glue. The mass is then filtered and the glass base is slightly warmed and covered by this compound spread thinly, or "painted" thereon. A sheet of veneer is then pressed upon the glass and allowed to remain for a period of time sufficient to cure and secure perfect adhesion, which period I have found in practice to be five or six days. Then the outer surface of this veneer is painted with the compound in the same manner and another sheet of veneer pressed thereon and allowed to remain for another period of time necessary to secure perfect adhesion and curing. Then a third sheet of veneer is placed on the outside surface of the second sheet of veneer in the same manner. The sheets of veneer are arranged with their respective grains crossing, as usual. After the whole is thoroughly cured the outer surface is finished until a fine mirror-like polish is attained.

The veneer or lumber thus formed will be found to maintain its shape permanently and the adhesive compound being of a character that will not be affected by weather or time, a polished surface for high grade furniture can be secured which is practically permanent.

Having thus fully described my said invention what I claim as new, and desire to secure by Letters Patent is:

1. The method of manufacturing veneering which comprises forming a compound of white glue, asbestos, and magnesia, in the manner described, covering a sheet of glass therewith, pressing a sheet of veneer upon the glass surface, covering the next sheet of veneer with the compound, pressing another sheet of veneer thereon, covering the second sheet of veneer with said compound, and pressing a third sheet of veneer thereon, and allowing a considerable period of time to elapse for adhesion and curing between the steps required for adding the successive sheets of veneer, all substantially as set forth.

2. The method of forming composite lumber which consists in covering a sheet of glass with an adhesive substance composed of glue, asbestos, and magnesia, compounded substantially as herein described, covering the glass therewith, pressing a sheet of veneer thereon, and adding successive sheets in the same manner, allowing a sufficient period for curing to elapse between said successive steps, substantially as set forth.

3. The method of manufacturing composite lumber consisting of adding sheets of wood veneer to a base consisting of a sheet of glass by securing said sheets of veneer to the glass and to each other successively by an adhesive compound, and allowing a sufficient time to elapse between the addition of successive veneers to permit of thorough adhesion and curing, substantially as set forth.

4. Composite lumber consisting of a sheet of glass as a base with its outside surface having several sheets of veneer secured successively thereto and to each other by adhesive compound, substantially as set forth.

In witness whereof, I have hereunto set my hand and seal at Washington, District of Columbia, this tenth day of October, A. D. nineteen hundred and thirteen.

GUSTAV TÜSCHEL. [L. S.]

Witnesses:
   E. W. BRADFORD,
   E. G. CLEMENTS.